United States Patent [19]
Roth

[11] Patent Number: 4,518,373
[45] Date of Patent: May 21, 1985

[54] SELF TENSIONING BELT DRIVE

[75] Inventor: Wolfgang Roth, Zweibrucken, Fed. Rep. of Germany

[73] Assignee: Deere & Company, Moline, Ill.

[21] Appl. No.: 481,094

[22] Filed: Mar. 31, 1983

[30] Foreign Application Priority Data

May 13, 1982 [EP] European Pat. Off. ........... 82104160

[51] Int. Cl.³ .............................................. F16H 7/08
[52] U.S. Cl. .................................... 474/109; 474/138
[58] Field of Search ............... 474/109, 112, 113, 117, 474/123, 11, 17, 50, 70, 136, 138, 102, 105, 106

[56] References Cited
U.S. PATENT DOCUMENTS 2,073,158  3/1935  Kindl et al. ......................... 474/109
2,859,848  11/1958  Bade ................................ 474/109 X
3,175,425  3/1965  Horne et al. ........................ 74/745

FOREIGN PATENT DOCUMENTS 16657 of 1909  United Kingdom .

Primary Examiner—Stephen J. Novosad
Assistant Examiner—Thuy M. Bui

[57] ABSTRACT

In a V-belt drive, the driven sheave is carried on a frame pivoted so that center distance between driver and driven sheaves can change. The position of the frame pivot is chosen so that the torque reaction of the driven load results in an induced torque about the pivot axis tending to increase belt tension appropriately as the driven load increases.

5 Claims, 4 Drawing Figures

SELF TENSIONING BELT DRIVE

BACKGROUND OF THE INVENTION

This invention concerns a belt drive for transmitting power between machine elements by means of a drive sheave carried on one element and a driven sheave carried on a second element and a belt trained around them and, more particularly, a means for controlling belt tension according to drive loading.

Simple belt tensioning arrangements using center distance adjustment or adjustment of an idler pulley against a run of the belt are well known. Typically, such devices produce an approximately constant tensioning force which must of course be adequate for the maximum load to be imposed on the drive. Thus, at partial load conditions, the drive system is subjected to unnecessarily high belt tension which may shorten the life of its components, such as the bearings of the driver and driven sheaves and of the belt itself.

SUMMARY OF THE INVENTION

Accordingly, in a belt drive subject to variable loading, it is an object of the invention to control belt tension according to the drive load so that belt tension is always close to an optimum value.

According to the invention, the driven sheave of a belt drive is movably carried, by a mounting arrangement that, in operation, induces a working tension in the belt and is directly mechanically responsive to changes in drive loading to vary the tension appropriately. An increase in drive load automatically results in a bias of the driven sheave in a direction of increasing belt tension.

In one form of the invention, the driven sheave is pivotally mounted on a frame for swinging movement about a fixed pivot whose axis is approximately parallel to the axis of rotation of the driven sheave. The pivot axis is disposed so that the pivoting movement of the driven sheave results in a change of center distance between it and the driver sheave. It is a feature of the invention to position the pivot axis so that when power is being transmitted, the torque reaction at the driven sheave mounting due to the rotational resistance applied to the driven sheave by a driven element, causes the driven sheave to tend to pivot on its frame about the axis in a direction of increasing center distance and hence of increasing belt tension.

It is a particular feature of the invention to dispose the pivot axis of the driven sheave frame so that the effective ratio of belt tension between the tight and slack sides of the belt is close to an optimum throughout the working range of the drive. In particular, the pivot axis may be located so that, assuming the belt stretches under load and there is displacement of the driven sheave, the belt tension ratio decreases as the torque transmitted increases. This corresponds to the standard practice followed in systems with conventional tensioning arrangements where no-load tension is set to produce a desired tension ratio at a particular load. But, of course, such conventional systems when subjectable to varying loads are optimized only at that given load.

The invention is well adapted to but not limited to a drive system in which the driven load may move physically with the driven sheave. For example, the driven element may be a power converter such as a hydraulic pump or electrical generator carried on a pivoted bracket and coaxial with and driven directly by the driven sheave.

Preferably, means are provided for maintaining an initial position for the driven sheave so that on start-up there is no excessive belt slip. This may be done by a resilient bias means arranged so as to impose an initial tension on the belt. Alternatively, a limiting stop may limit swinging movement of the driven sheave carrier frame so that when idle, center distance spacing is such as to impose a small tension in the belt. In some configurations, the force of gravity may be used to provide the initial tension. Note that initial tension is not absolutely necessary but may contribute to drive efficiency and longer belt life.

DESCRIPTION OF THE PREFERRED EMBODIMENT

Figure 1:
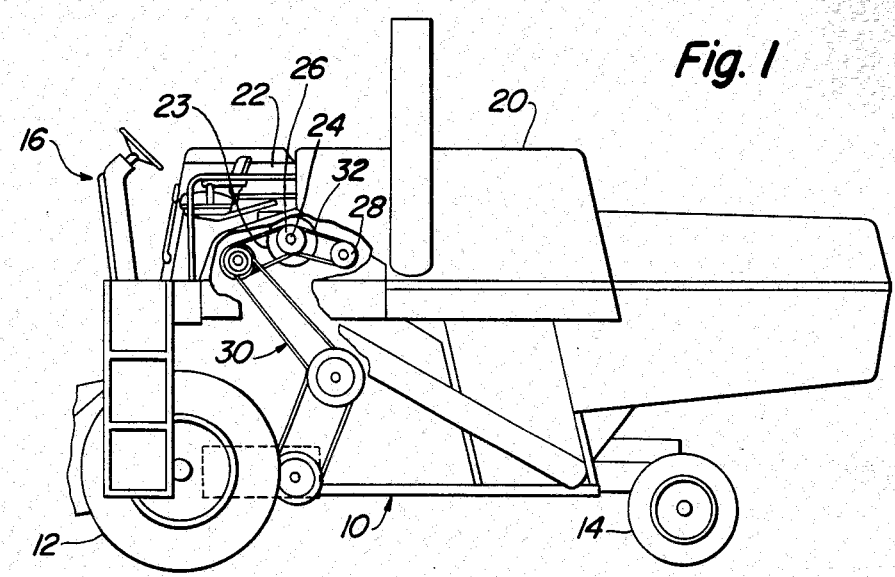
FIG. 1 is a somewhat schematic left-hand side elevation of a combine harvester embodying the invention.

The invention is embodied in an otherwise conventional self-propelled combine shown in FIG. 1. The body 10 of the combine is supported above the ground on front and rear wheels 12 and 14 respectively and controlled from a forward elevated operator station 16. In operation in a field of crop, the harvester gathers crop material, threshes and separates it and delivers clean grain to a tank 20 behind the operator station 16. Adjacent the operator station 16 is an engine enclosure 22 enclosing an engine 23 which with suitable powershaft and take-off arrangements, provides power for the entire machine. For example, from powershaft 24 a variable speed V-belt drive 30 transmits power for propulsion of the vehicle by means of the front wheels 12.

Figure 2:
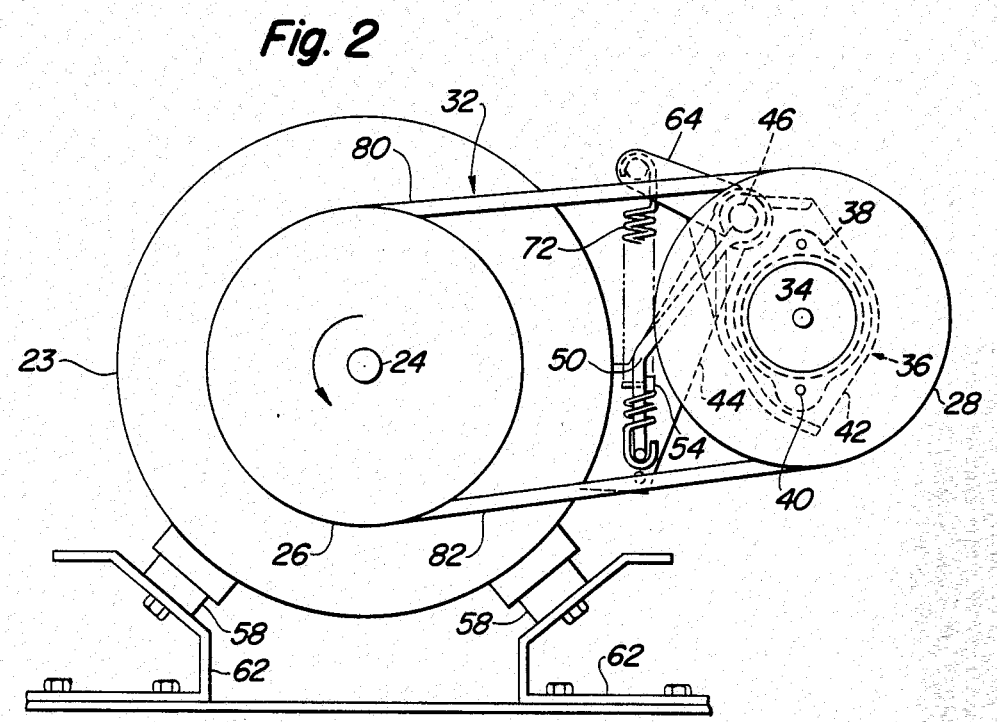
FIG. 2 is a somewhat schematic enlarged left-hand side view of a particular drive of the combine embodying the invention.

As seen best in FIG. 2, the powershaft 24 also provides the input to a driven element 36 by way of a conventional V-belt driving sheave 26 and a driven sheave 28 connected by V-belt 32, and a driven shaft 34. In this embodiment, the driven element 36 is a power converting unit such as a hydraulic pump coaxial with the sheave 28 and driven directly by the shaft 34.

The pump 36 is carried on a support frame 42 and attached conventionally by pump flange 38 and suitable bolts 40. The support frame 42, carrying the driven sheave 28, output shaft 34 and pump 36 is pivotally supported on the combine frame 10 by way of a pivot support 44 directly attached to the frame of the engine 23 through a mounting flange 50 and suitable bolts 54. Pivot pin 46 couples the support frame 42 to the support 44. The engine 23 is mounted on the combine frame 10 by conventional vibration absorbing mountings 58 and suitable brackets 62. The driven sheave 28/pump 36 assembly is biased away from the driver sheave 26 by a tension spring 72 coupled between a lever or bell crank 64 (integral with the support frame 42) and the combine frame.

Figure 4:
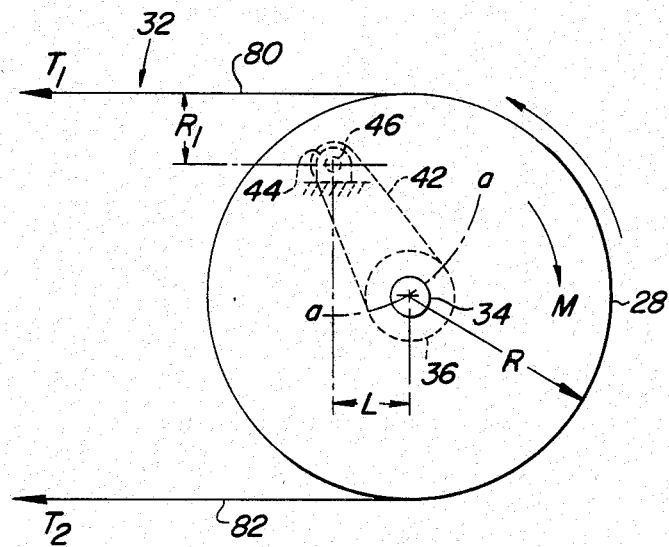
FIG. 4 is a simplified schematic representation of the forces acting on the driven sheave of FIG. 2 when the drive is in operation.

In operation, power is transmitted from the driver sheave 26 to driven sheave 28 by the V-belt 32 with direction of rotation as indicated in FIGS. 2 and 4. Carried by the support frame 42, the driven sheave 28 is swingable in an arc about pivot pin 46 but subject to the control of the tension spring 72 and the tension of the belt 32. With the system at rest, the spring 72 biases the sheave so as to tend to increase center distance and apply an "initial" tension in the V-belt 32. In operation under load, that is with the pump 36 providing a hydraulic power output for operation of one or more hydraulic actuators of the combine, the upper and lower runs of the V-belt 80 and 82 respectively become the tight side and slack side of the V-belt drive. The disposition of the pivot 46 is such that, together, the torque reaction of the pump 36 and the belt tensions derived from it generate a turning moment about the pivot 46 in a counterclockwise direction thus providing an additional tensioning force for the belt 32. This self-tensioning of the belt will be discussed in detail below.

Figure 3:
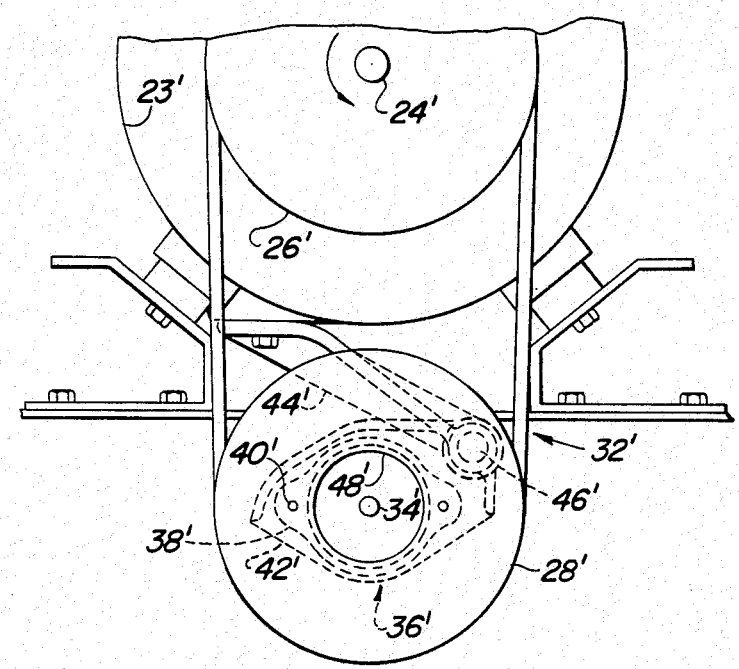
FIG. 3 is a view similar to FIG. 2 of an embodiment of the invention employing an alternative method of providing initial tension in the belt.

An alternative embodiment of the invention is shown in FIG. 3. In this arrangement, the driven sheave 28' is generally vertically below the drive sheave 26' and the driven assembly comprising sheave 28', driven shaft 34' and hydraulic pump 36' are supported on a pivot 46' which is horizontally offset from the center of mass of the driven assembly. Thus the belt 32' supports the driven components and hence receives an initial tension without the aid of springs or other bias means.

FIG. 4 represents schematically some important elements of a drive according to the invention and forms the basis for the following discussion of its characteristics. For simplicity, the upper and lower runs 80, 82, respectively, of the belt 32 are assumed to be parallel and horizontal and, as in FIG. 2, direction of rotation is such that the upper run 80 is the tight side of the belt and the respective belt tensions are indicated by $T_1$ and $T_2$. Again, fior simplicity in discussion, it is assumed that there is no conventional bias means present so that initial tensions in the belt are zero, and further, that the pivot 46 is frictionless. Also the mass of the driven components is neglected. The effective diameter of the driven sheave 28 is 2R and the perpendicular distance of the pivot 46 from the line of action of the upper strand or tight side of the belt 80 is $R_1$. The pivot 46 is also offset horizontally a distance 1 from the center (34) of the driven sheave 28 in the direction of the driver 26. The configuration or geometry shown in FIG. 4 may be taken as the condition obtaining when the belt 32 is of nominal or design length.

Some of the force relationships effective when the driven output shaft 34 is under load (for example, a hydraulic power load from the pump 36); the system is in a steady state; and the drive load corresponds to a torque M; (and applying well-known mechanical principles) are as follows:

For the sheave 28 with respect to its axis of rotation (center of shaft 34):

$$(T_1 - T_2)R = M \tag{1}$$

For the sheave 28 and pump 36 as a unit with respect to pivot 46:

$$T_1 R_1 = T_2 (2R - R_1) \tag{2}$$

For the axial or horizontal forces effective at the pivot 46:

$$T_1 + T_2 = T = M/R - R_1 \tag{3}$$

In discussing drive configurations according to the invention, with their potential for automatically controlling belt tension according to drive loading, belt tension ratio and the principal variable affecting it, namely position of the pivot bracket (46), are important considerations. The ratio of respective distances of the driven sheave center (34) and the pivot (46) from the tight side of the belt $R/R_1$ may be conveniently expressed as r. $(R/R_1 = r)$ From equation (2), $$T_1/T_2 = (2R - R_1)/R_1 = 2r - 1 \tag{4}$$

Thus tension ratio $(T_1/T_2)$ varies directly with r and is independent of the torque transmitted (assuming for the moment that there is no belt stretch permitting movement of the sheave center relative to the pivot).

From equation (3), it can be seen that the net belt tension T is directly proportional to the torque (M) transmitted.

In further examining the operation of a drive according to the invention, we note the following: it is inherent in such drives that the direction of belt tension forces $T_1$ and $T_2$ are in the same direction and so for the steady state expressed by the equation (2) above, the pivot point (46) must lie between the lines of action of $T_1$ and $T_2$. Further, for overcoming the torque load M of the driven element, $T_1$ must be greater than $T_2$ (or $T_1/T_2$ must be greater than 1).

From equation (4), it can also be deduced that r must be greater than 1, given that by definition $T_1/T_2 > 1$. Therefore, pivot 46 must be between the rotational axis (34) of the driven sheave (28) and the line of action (80) of the tight side of the belt ($T_1$).

It is well known that in belt drive design, considerations of component life (including that of the belt itself) make it desirable not only that total belt tension T (or $T_1 + T_2$) should be proportional to torque transmitted but that also belt tension ratio $T_1/T_2$ should, for best efficiency, diminish as torque transmitted increases. We have just shown that the invention provides automatic control of the first of these desiderate. The second feature (control of belt tension ratio, $T_1/T_2$) is obtained by accepting or designing for the fact of belt stretch under load. It can be seen that a pivot (46) location such as that shown in FIGS. 2 and 4 would result, upon stretching of the belt, in moving of the sheave center outwards and upwards along arc aa. It can also be readily seen that such a movement would effectively reduce the ratio r and hence the belt tension ratio $T_1/T_2$. The optimization of design in a particular belt drive according to the invention and the design objectives will clearly depend upon the particular application or working environment, but principal design variables will clearly include disposition of the bracket (46) and type of belt construction including its stretch characteristics.

As an example of calculations involved in applying the invention to a particular application, let us assume as a design objective, a belt tension ratio $T_1/T_2$ of 8 at maximum load and a lower tension ratio of 5 at a lower or partial load. Using equation (4): when $T_1/T_2 = 8$, $r = 4\frac{1}{2}$ and when $T_1/T_2 = 5$, $r = 3$. These values of r indicate the range of distance from the tight side ($T_1$) line of action through which the pivot (46) must effectively move. A nominal location may then be found (defined in part by nominal offset 1) for the pivot (46) which, in combination with a belt of given length and stretch characteristics and the predetermined load levels, will result in a range of displacement of the sheave center (34) along an arc such as aa required to produce the desired changes in belt tension ratio.

Incidentally, it is noted that the above discussion indicates that for most drives, appropriate r ratios ($R/R_1$) are likely to be more than 2.

Obviously, when an initial belt tension is provided by some tensioning device, such as the spring 72 shown in FIG. 2, variation in belt tension resulting from torque reaction of the driven load and the particular pivot location will be superimposed on this initial tension. The use of an initial tensioning device would only modify or provide a "zero shift" in the performance characteristics of a drive according to the invention, rather than change its essential character. It may be advantageous to provide an initial tension to minimize belt slip and wear on start-up but such provision is not essential to the practice of the invention. Similarly, with or without an initial tensioning device, it may be advantageous to provide a damper or shock absorber to stabilize swinging movement of the driven members (28, 34, 36) about the pivot axis (46).

I claim:

1. A belt drive for a machine having a power source and a frame comprising:
   a driver sheave rotatably mounted on the frame and drivably connected to the power source;
   a driven sheave rotatably carried by the frame and drivably connected to a driven element, said element having an axis of rotation and imposing a variable load on the belt drive;
   a drive belt trained around the respective sheaves for transmitting power between them, said belt having a tight side and a slack side, and said tight side engaging the driven sheave so as to define a line of action for the belt spaced at a given effective radius from the center of the driven sheave; and
   mounting means for mounting the driven sheave on the frame for oscillation about a pivot axis, said pivot axis being spaced from the axis of rotation of the driven element and disposed generally parallel to the axis of rotation of the driven sheave and lying between said axis and the line of action of the tight side of the belt so that the mounting means is directly mechanically responsive to the load imposed on the driven sheave by the driven element so that an increase of load biases the driven sheave away from the driver sheave so as to increase the effective tension of the belt, the pivot axis being disposed so that the biasing of the driven sheave responsive to an increase in drive load is in a direction tending to decrease the ratio of the effective radius to the distance from the pivot to the line of action.

2. The belt drive of claim 1 wherein the pivot axis is closer to the line of action of the belt than to the axis of rotation of the driven sheave.

3. The belt drive of claim 1 wherein the mounting means for the driven sheave includes resilient means for biasing said sheave away from the driver sheave so as to impose an initial tension on the belt.

4. The belt drive of claim 3 wherein the mounting means for the driven sheave comprises a bracket carrying the sheave and pivotable about the pivot axis and wherein the resilient means comprises a spring connected between the frame of the machine and the bracket so that the line of action of the spring is offset from the pivot axis so as to bias the driven sheave away from the driver sheave.

5. The belt drive of claim 1 wherein the driven element is coaxial with and directly driven by the driven sheave.

* * * * *